US 8,350,885 B2

(12) United States Patent
Cho

(10) Patent No.: US 8,350,885 B2
(45) Date of Patent: Jan. 8, 2013

(54) MOBILE TERMINAL FOR RECEIVING DIGITAL BROADCASTING AND METHOD FOR THE SAME

(75) Inventor: Beom-Soo Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1298 days.

(21) Appl. No.: 11/924,579

(22) Filed: Oct. 25, 2007

(65) Prior Publication Data
US 2008/0119242 A1    May 22, 2008

(30) Foreign Application Priority Data
Nov. 21, 2006  (KR) ................ 2006-115272

(51) Int. Cl.
*H04N 7/14* (2006.01)
*H04M 1/00* (2006.01)
(52) U.S. Cl. .................... 348/14.01; 455/574
(58) Field of Classification Search ........... 348/14.01, 348/14.13, 14.14; 455/573, 574
See application file for complete search history.

(56) References Cited

U.S. PATENT DOCUMENTS

| | | | |
|---|---|---|---|
| 2005/0240786 A1* | 10/2005 | Ranganathan | 713/320 |
| 2006/0285817 A1* | 12/2006 | Kim | 386/46 |
| 2007/0153914 A1* | 7/2007 | Hannuksela et al. | 375/240.26 |
| 2007/0254696 A1* | 11/2007 | Kajitani | 455/556.1 |

FOREIGN PATENT DOCUMENTS

| | | | |
|---|---|---|---|
| KR | 1020040036358 A | * | 10/2002 |
| KR | 10-2004-0036358 A | | 4/2004 |
| KR | 10-2006-0014821 A | | 2/2006 |
| KR | 10-2006-0114134 A | | 11/2006 |
| KR | 1020060114134 A | * | 11/2006 |

* cited by examiner

*Primary Examiner* — Curtis Kuntz
*Assistant Examiner* — Sunita Joshi
(74) *Attorney, Agent, or Firm* — Jefferson IP Law, LLP

(57) ABSTRACT

A mobile terminal for receiving digital broadcasting is disclosed. The mobile terminal includes a battery capacity detector, a digital broadcasting receiving unit, a power consumption amount database, and a controller. The battery capacity detector detects a current usable capacity of a battery, and the digital broadcasting receiving unit receives the digital broadcasting. The power consumption amount database stores information regarding the power consumption of components necessary for receiving and outputting the digital broadcasting. The controller receives the usable capacity of the battery from the battery capacity detector upon receiving the digital broadcasting, calculates the power necessary for receiving the digital broadcasting with reference to the power consumption amount database, compares the usable capacity of the battery with the necessary power, and controls the power applied to the components necessary for receiving and outputting the digital broadcasting according to a plurality of power saving requirements if the usable capacity of the battery is lower than the necessary power.

18 Claims, 8 Drawing Sheets

MOBILE TERMINAL FOR RECEIVING DIGITAL BROADCASTING AND METHOD FOR THE SAME

PRIORITY

This application claims the benefit under 35 U.S.C. §119 (a) of a Korean patent application filed in the Korean Industrial Property Office on Nov. 21, 2006 and assigned Serial No. 2006-115272, the entire disclosure of which is hereby incorporated by reference.

BACKGROUND OF THE INVENTION

1. Field of the Invention

The present invention generally relates to an apparatus and a method for receiving digital broadcasting. More particularly, the present invention relates to an apparatus and method of reducing power consumption while receiving digital broadcasting in a mobile terminal.

2. Description of the Related Art

Mobile digital broadcasting technologies have been rapidly developed recently. The mobile digital broadcasting standards adopted throughout the world can be generally classified into three technologies: first, Digital Multimedia Broadcasting (DMB), which has been adopted in South Korea as a standard for mobile broadcasting, second, Digital Video Broadcasting-Hand Held (DVB-H), which is currently expected to be adopted in Europe, and third, media Forward Link Only (FLO) technology, which has been developed by Qualcomm Incorporated of San Diego, Calif.

As the development of digital broadcasting technologies has grown, mobile terminals having functions for receiving the digital broadcasting have been developed so that users of the mobile terminals can watch the digital broadcasting while moving.

The mobile terminal has a disadvantage in that usable power is limited due to portability. Accordingly, various technologies have been suggested to assure that a minimum capacity of a battery remains so that basic telephone functions of the mobile terminal can be used. One of these technologies is that if the capacity of the battery of the mobile terminal becomes low, the mobile terminal limits the operation of accessory functions. For example, when the user watches a digital mobile broadcasting of a sports game with the mobile terminal, if the usable capacity of the battery of the mobile terminal becomes lower than a predetermined value, the mobile terminal stops receiving and outputting the digital broadcasting to maintain sufficient power to perform the basic telephone functions of the mobile terminal. As another example, if the mobile terminal is operated as an MP3 player and the battery capacity of the mobile terminal reaches a low state, the mobile terminal stops playing the MP3 music files.

As such, when the capacity of the battery of the mobile terminal reaches a low state, the mobile terminal limits the accessory functions to maintain a minimum capacity of the battery to use the telephone functions. Therefore, as long as the battery of the mobile terminal is not charged, the mobile terminal does not perform any operations relating to the accessory functions.

With respect to the MP3 music files, these files are generally stored in a nonvolatile memory of the mobile terminal and thus the user can listen to the MP3 music files after charging the battery. In contrast, the user generally hopes to watch digital broadcasting in real time. However, the described power saving function of the mobile terminal causes the result that the user can not watch his/her desired program.

In addition, to decrease power consumption of the mobile terminal, a technology has been suggested in which the operations of components of the mobile terminal are stopped for a predetermined time, or operated with low power, if the user does not make an input for a predetermined time.

However, when the mobile terminal receives digital broadcasting, the user does not operate the mobile terminal while watching the digital broadcasting. Thus, this technology can not be applied to the components used for receiving and outputting digital broadcasting in the mobile terminal.

SUMMARY OF THE INVENTION

An aspect of the present invention is to address the above-mentioned problems and/or disadvantages, and to provide at least the advantages described below. Accordingly, an aspect of the present invention is to provide a mobile terminal and a method for a user to receive a digital broadcasting program even though a mobile terminal equipped with a function of receiving a mobile digital broadcasting is in a low power state.

In accordance with an aspect of the present invention, a mobile terminal for receiving digital broadcasting is provided. The mobile terminal includes a battery capacity detector, a digital broadcasting receiving unit, a power consumption amount database, and a controller. The battery capacity detector detects the current usable capacity of a battery, and the digital broadcasting receiving unit receives the digital broadcasting. The power consumption amount database stores information regarding the power consumption of components necessary for receiving and outputting the digital broadcasting. The controller receives the usable capacity of the battery from the battery capacity detector, calculates the power necessary for receiving the digital broadcasting with reference to the power consumption amount database, and compares the usable capacity of the battery with the necessary power to control the power applied to the components necessary for receiving and outputting the digital broadcasting according to a plurality of power saving requirements if the usable capacity of the battery is lower than the necessary power.

In accordance with another aspect of the present invention, a method of receiving digital broadcasting in a mobile terminal is provided. The method includes the steps of preparing a power consumption amount database that stores information regarding the power consumption of components necessary for receiving and outputting digital broadcasting, obtaining a usable capacity of the battery of the mobile terminal when receiving the digital broadcasting, calculating the power capacity necessary for receiving the digital broadcasting with reference to the power consumption amount database, and comparing the usable capacity of the battery with the necessary power to control the power applied to the components necessary for receiving and outputting the digital broadcasting according to a plurality of power saving requirements if the usable capacity of the battery is lower than the necessary power.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The components of a mobile terminal will be described with reference to FIG. 1.

Figure 1:
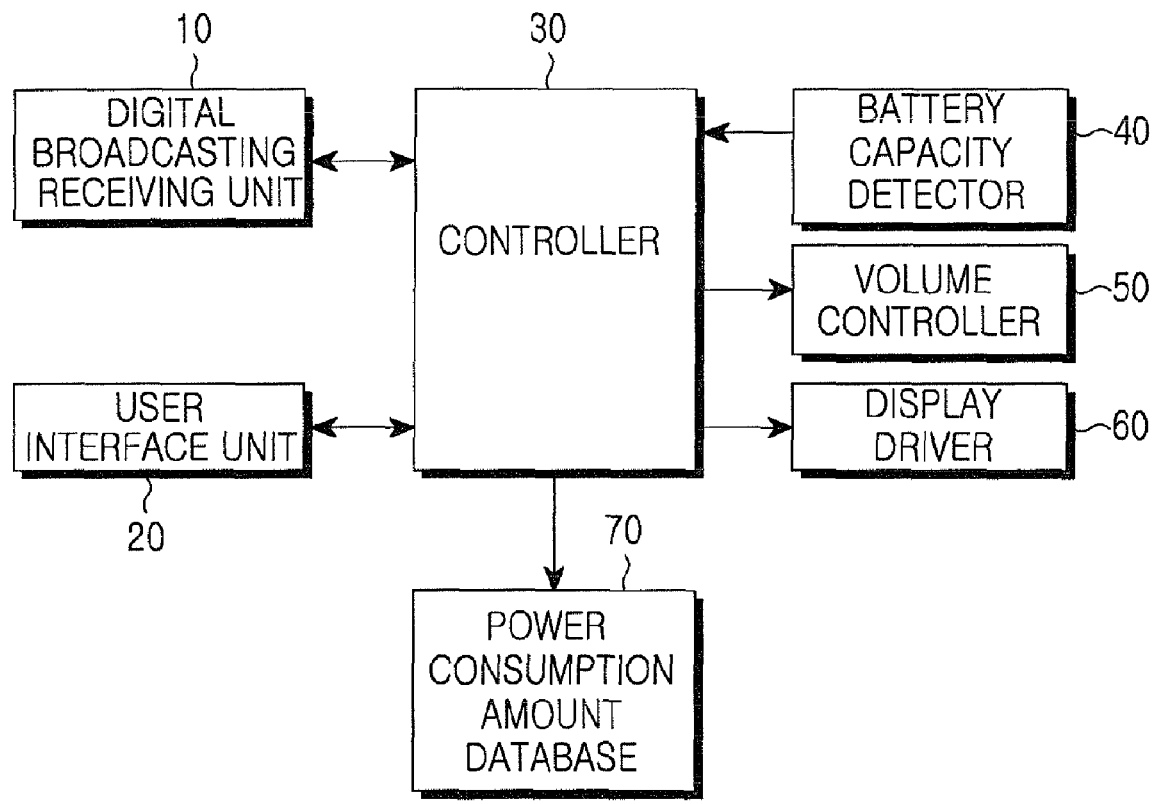
FIG. 1 is a block diagram of a mobile terminal according to an exemplary embodiment of the present invention.

FIG. 1 is a block diagram of the mobile terminal according to an exemplary embodiment of the present invention. Referring to FIG. 1, the mobile terminal includes a digital broadcasting receiving unit 10, a user interface unit 20, a controller 30, a battery capacity detector 40, a volume controller 50, a display driver 60 and a power consumption amount database 70.

According to an exemplary embodiment of the present invention, to allow a user to watch digital broadcasting, the controller 30 controls components of the mobile terminal based on a usable capacity of a battery while receiving the digital broadcasting.

In detail, when receiving the digital broadcasting, the controller 30 obtains the total broadcasting duration for the user to watch a program and the current usable capacity of the battery. The controller can obtain the total broadcasting duration for watching from the received broadcasting data, or the user can directly input the total broadcasting duration of the program for watching to the mobile terminal. For example, the broadcasting data in a satellite DMB includes broadcasting program information so that, when receiving the broadcasting data, the controller 30 of the mobile terminal can obtain the broadcasting duration of the program. The broadcasting data in a terrestrial DMB does not include broadcasting program information so the controller 30 requires that a user input the broadcasting duration of the program when receiving the digital broadcasting. In addition, the current usable capacity of the battery is detected by the battery capacity detector 40. The battery capacity detector 40 supplies the detected usable capacity of the battery to the controller 30.

After obtaining the total broadcasting duration and current usable capacity of the battery, the controller 30 selects the optimum power saving requirements among multiple power saving requirements based on the power consumption amount of the components relating to receiving and outputting the digital broadcasting.

To this end, the mobile terminal includes the database 70 that stores the information regarding the power consumption amount of the components relating to receiving and outputting the digital broadcasting. As shown in Table 1 below, in an exemplary embodiment, the stored information includes the current consumption amount according to a brightness level of a backlight of a display, current consumption amount according to a volume level of an audio apparatus and current consumption amount during processing of an I frame/P frame.

TABLE 1

| Item | | Power consumption amount |
|---|---|---|
| Display | Level 1 | 100 mA/hour |
| | Level 2 | 110 mA/hour |
| | Level 3 | 120 mA/hour |
| Speaker | Level 1 | 700 mA/hour |
| | Level 2 | 80 mA/hour |
| | Level 3 | 90 mA/hour |
| I frame decoding | | 0.002 mA/hour |
| P frame decoding | | 0.001 mA/hour |

The optimum power saving requirements are determined in order for the mobile terminal to output the broadcasting programs which the user desires to watch or listen for the entire broadcasting duration with the current usable capacity of the battery.

For example, the controller 30 may control the volume controller 50 to turn down the volume of the audio apparatus outputted through a speaker (not shown), or the display driver 60 to lower the brightness level of the backlight of the display. In addition, the controller 30 may control the digital broadcasting receiving unit 10 to selectively decode the receiving video frames.

Further, the controller 30 displays the available duration for receiving the digital broadcasting in the power saving mode to the user through the display. In this case, the controller 30 uses the saving mode information referring to the power consumption amount database 70 to calculate the available duration for receiving the digital broadcasting periodically, and then displays the calculated duration on the display.

The user interface 20 includes a plurality of number and function keys, and outputs the key input data corresponding to the key pressed by the user to the controller 30.

A method for performing the power saving mode when receiving the digital broadcasting in the mobile terminal including the described components will be explained with reference to the FIG. 2.

Figure 2:
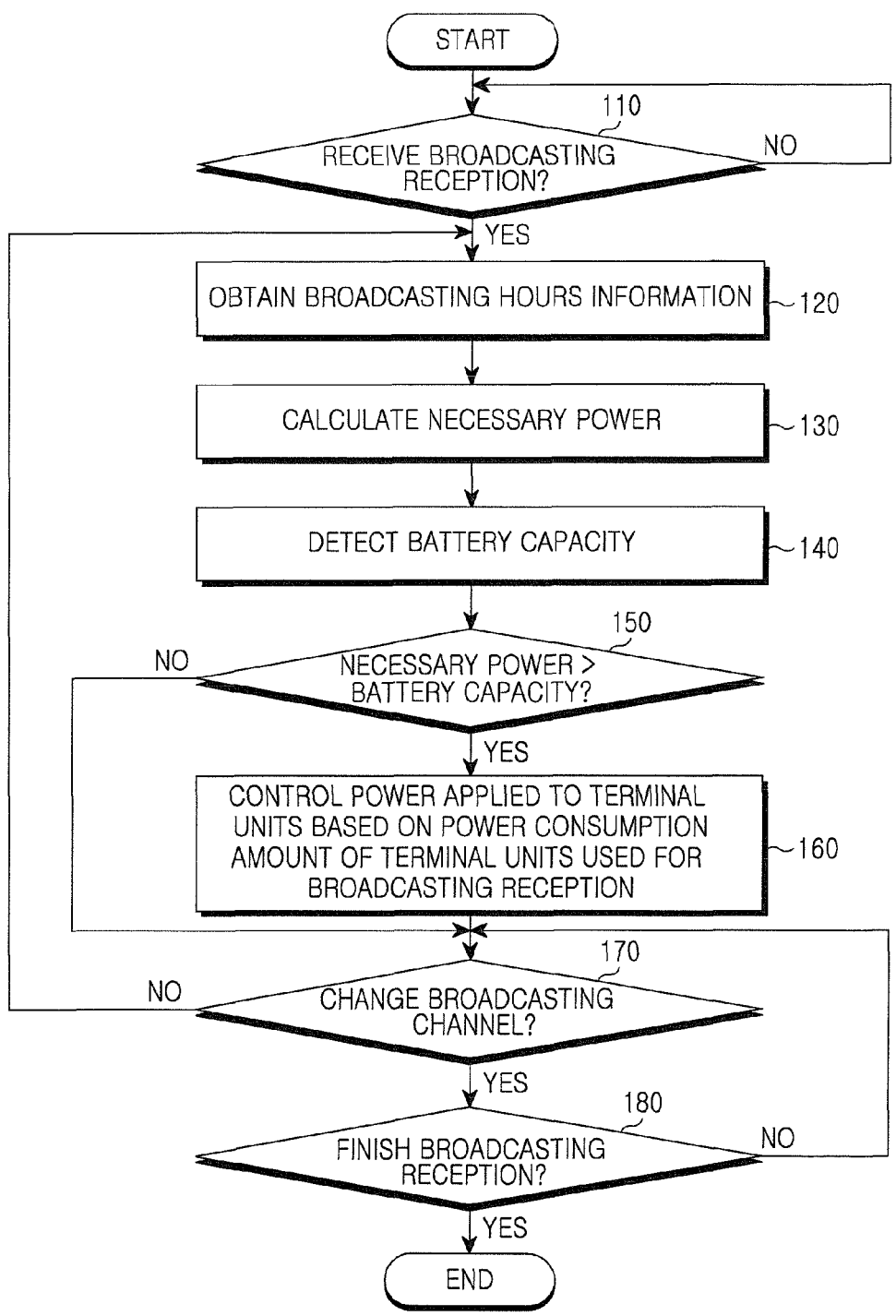
FIG. 2 is a flowchart illustrating a method of performing a power saving mode when receiving digital broadcasting according to an exemplary embodiment of the present invention.

Referring to FIG. 2, the controller 30 of the mobile terminal checks whether to receive the digital broadcasting in step 110. The user can select the desired broadcasting program through the mobile terminal to watch or listen. If a predetermined broadcasting program is selected by the user, the mobile terminal receives the broadcasting data through the digital broadcasting receiving unit 10.

Then, in step 120, the controller 30 obtains the information regarding the entire broadcasting duration of the broadcasting program which the user desires to watch. As described above, the entire broadcasting duration of the broadcasting program can be obtained from the broadcasting data or input by the user. If the controller 30 does not obtain the entire broadcasting duration from the received broadcasting data, it includes a pop-up window or an input window for the user to input the entire broadcasting duration of the corresponding broadcasting program.

After obtaining the information regarding broadcasting duration in step 130, the controller 30 receives the corresponding broadcasting data for obtained broadcasting duration and calculates the necessary power to provide the user with the broadcasting. Then, in step 140, the controller 30 detects the current usable capacity of the battery through the battery capacity detector 40.

The controller 30 compares the calculated necessary power and the usable capacity of the battery, i.e., determines whether the necessary power is larger than the usable power of the battery. If the necessary power is larger than the usable power of the battery, the controller 30 proceeds to step 160 and controls the power applied to the components of the terminal according to the multiple power saving requirements based on the power consumption amount of the components of the terminal used for receiving and outputting the broadcasting.

In detail, the controller 30 selects the optimum power saving requirements among the multiple power saving requirements based on the power consumption amount of the components relating to receiving and outputting the digital broadcasting.

The multiple power saving requirements includes decreasing the brightness level of the backlight of the display, turning down the volume level of the audio apparatus, selectively decoding of the video frames (including the I-frame and P-frame) and the like.

The controller 30 controls the volume controller 50, the display driver 60, the digital broadcasting receiving unit 10 or the like to control the power applied to the components of the terminal used for the receiving and outputting the broadcasting according to the selected power saving requirements.

For example, as described above, the controller 30 may control the volume controller 50 to turn down the volume of the audio apparatus output from the speaker (not shown), or control the display driver 60 to decrease the brightness level of the backlight of the display. In addition, the controller 30 may control the digital broadcasting receiving unit 10 to selectively decode the received video frames.

The selective decoding of the video frame can be implemented according to various methods, such as dropping P-frames and decoding all I-frames, dropping P-frames and selectively decoding I-frames and decoding all I-frames and selectively decoding P-frames.

In step 170, the controller 30 determines whether a broadcasting channel (broadcasting program) is changed or not. The change of the broadcasting channel refers to the change of the broadcasting program. If the broadcasting program is changed, the power necessary for receiving and outputting the broadcasting data for the broadcasting duration of the corresponding program is also changed. Accordingly, if the broadcasting channel was changed, the controller 30 returns to step 120.

Then, in step 180, the controller 30 determines whether or not the broadcasting reception is finished. If the broadcasting reception is not finished, step 170 is repeated.

As such, if the power necessary for receiving the digital broadcasting is larger than the usable capacity of the battery, the mobile terminal controls the broadcasting quality and available playing time according to the exemplary embodiments of present invention.

For example, if the user wants to watch the World Cup final game using a digital mobile broadcasting mobile phone while outdoors, the capacity of the battery necessary for playing the broadcasting for at least 90 minutes should be obtained. According to the exemplary embodiments of the present invention, the mobile terminal can select the broadcasting quality and control the available duration for playing.

The components of the digital broadcasting receiving unit 10 for selective decoding of the video frames will be described with reference to FIG. 3.

Figure 3:
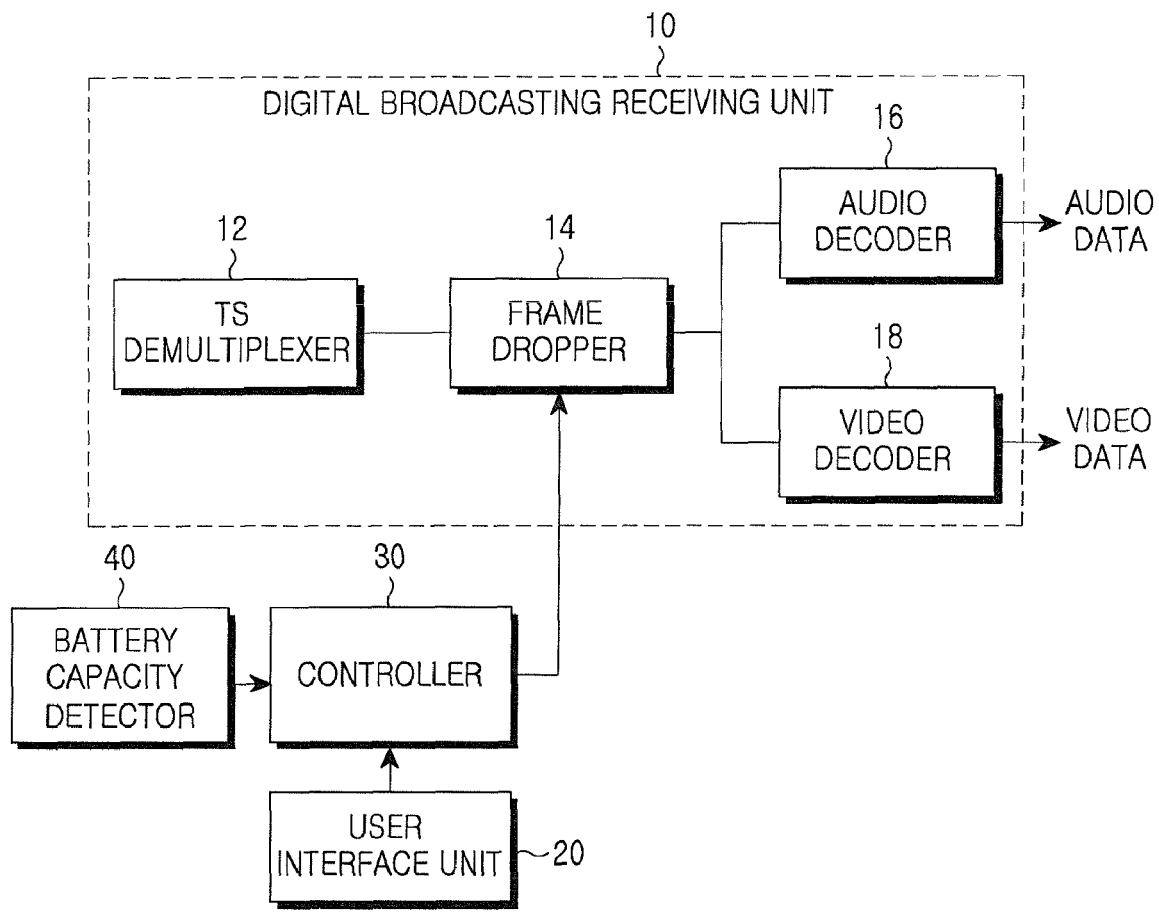
FIG. 3 is a block diagram illustrating the components of a digital broadcasting receiving unit of the mobile terminal shown in FIG. 1.

Referring to FIG. 3, the digital broadcasting receiving unit 10 includes a transmission stream (TS) demultiplexer 12 receiving a TS packet and forming audio frames and video frames, an audio decoder 230 that decodes audio by receiving the audio frames from the TS demultiplexer 12 and outputting the audio data, and a video decoder 18 that decodes video by receiving the video frames from the TS demultiplexer 12 and outputting the video data. Further, the digital broadcasting receiving unit 10 includes a frame dropper 14 that selectively drops the audio frames supplied to the audio decoder 16 or the video frames supplied to the video decoder 18 under the control of the controller 30. A small amount of power is consumed for decoding the audio frames, so that the audio frames are seldom dropped. A large amount of power is consumed for decoding the video frames, so that video frames are usually dropped in the power saving mode.

Figure 5:
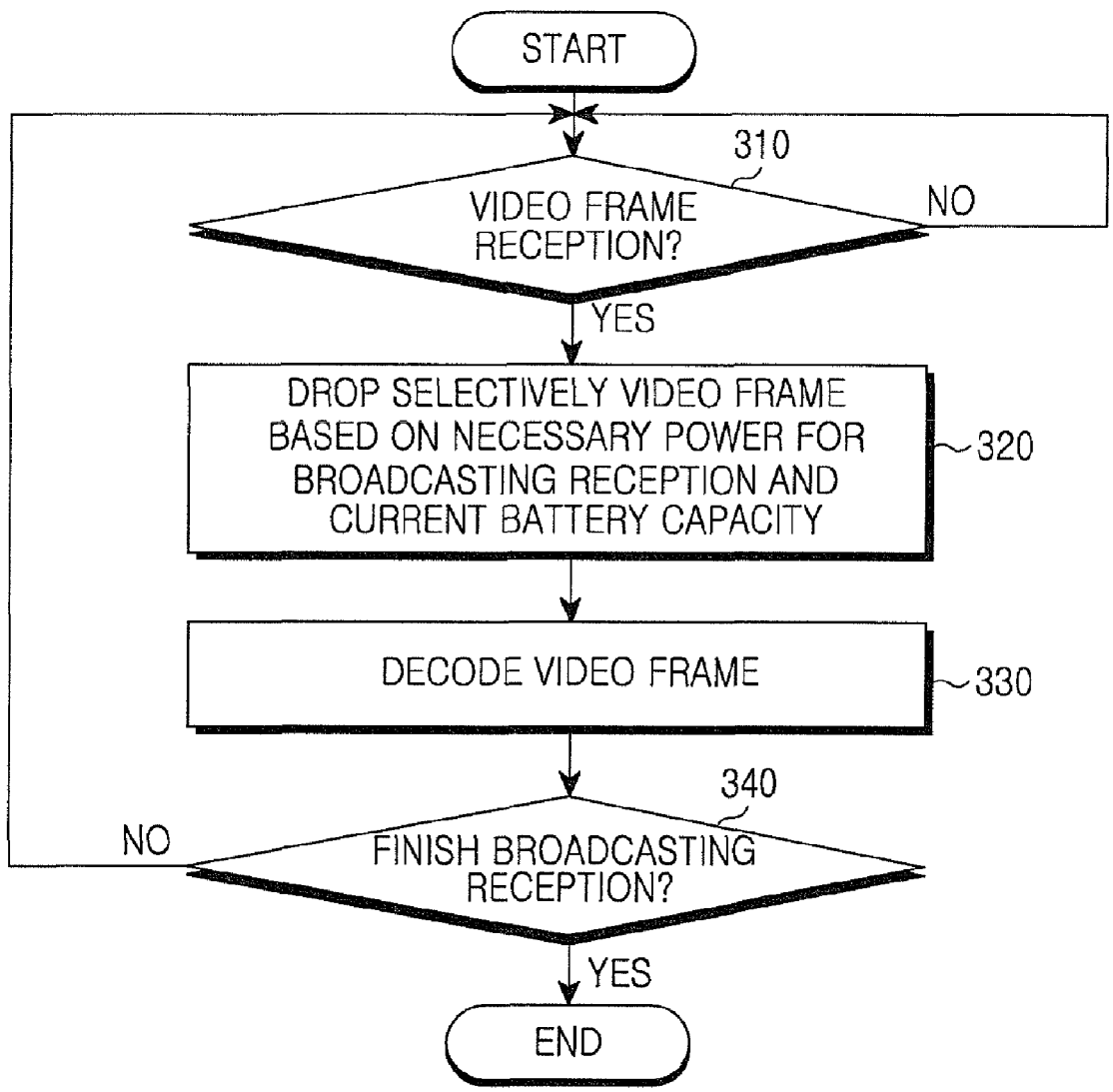
FIG. 5 is a flowchart illustrating a method of selectively dropping video frames in the digital broadcasting receiving unit according to an exemplary embodiment of the present invention.

FIG. 5 illustrates a method for the digital broadcasting receiving unit to selectively drop the video frames under the control of the controller. Referring to FIG. 5, in step 310, the digital broadcasting receiving unit 10 determines whether or not the frame dropper 140 receives the video frames from the TS demultiplexer 12. Then, the digital broadcasting receiving unit 10 instructs the frame dropper 14 to selectively drop the video frames based on the power necessary for receiving and outputting the broadcasting and the current usable capacity of the battery.

Then, the digital broadcasting receiving unit 10 decodes the video frames selected in step 330, and determines whether or not the reception of the broadcasting is finished in step 340. If the broadcasting reception is not finished, the digital broadcasting receiving unit 10 returns to step 310.

Figure 4:
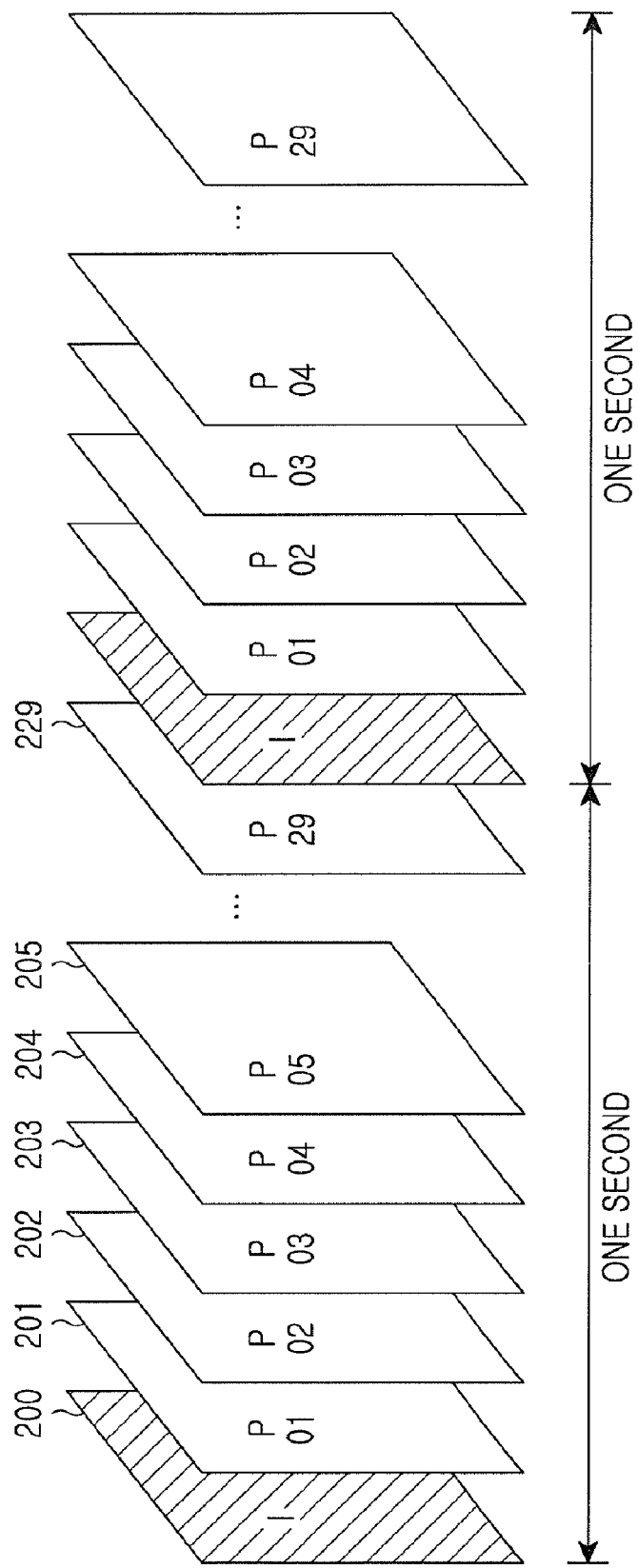
FIG. 4 illustrates video frames based on a terrestrial DMB standard.

The selective decoding of the video frame will be described with reference to FIG. 4. FIG. 4 illustrates the video frames based on a terrestrial DMB standard. Referring to FIG. 4, according to the terrestrial DMB standard, the video frames include one I-frame and 29 P-frames per second. The I-frame 200 among the frames is used for forming most video images, and the P-frames 201 through 229 are used for forming an image of a motion part of the video based on the I-frame and the previous P-frame of its own P-frame. Therefore, the selective decoding of the video frame is implemented by the scheme of decoding the I-frame and dropping the P-frames. As described above, the selective decoding of the video frame includes the methods of dropping P-frames and decoding all I-frames, dropping P-frames and selectively decoding the I-frame, and decoding all I-frames and selectively decoding P-frames. Among these methods, an appropriate method is selected based on the current usable capacity of the battery.

The method of dropping P-frames and selectively decoding the I-frame will be described with reference to FIG. 6.

Figure 6:
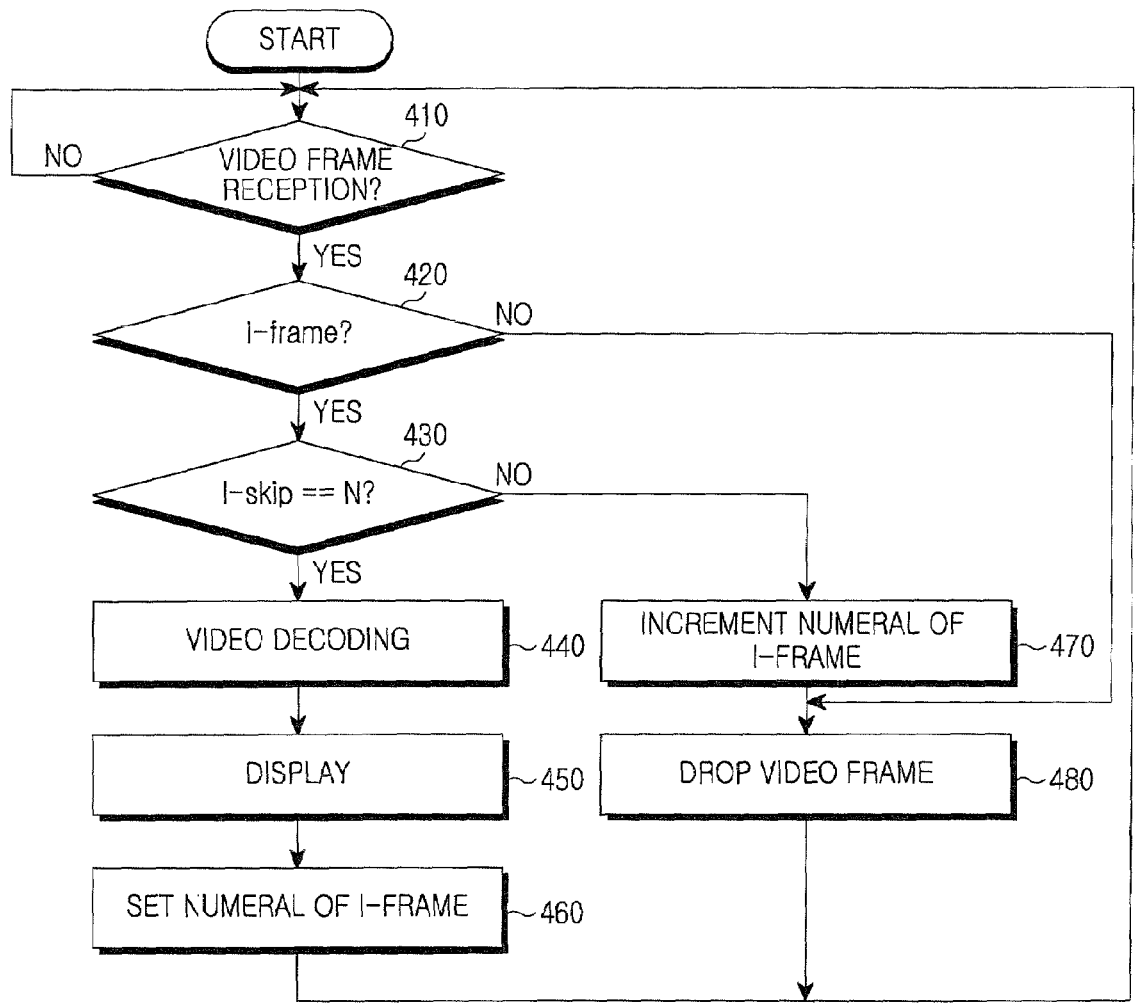
FIG. 6 is a flowchart illustrating a method of dropping all P-frames and decoding every Nth I-frame according to an exemplary embodiment of the present invention.

FIG. 6 illustrates the method of dropping all P-frames and decoding every Nth time I-frame. In order to enable determination if the I-frame is every Nth frame, a numeral is allocated to each of the received I-frames. Also, when an Nth I-frame has been received and decoded, the number of the I-frame is reset (set) to 0, so as to identify another Nth I-frame. In this way, it is possible to decode, for example, every 5th I-frames.

Referring to FIG. 6, in step 410, the digital broadcasting receiving unit 10 determines whether or not to the frame dropper 140 receives the video frame from the TS demultiplexer 12. Subsequently, the digital broadcasting receiving unit 10 determines whether or not the received video frame is an I-frame. If the received video frame is a P-frame, the digital broadcasting receiving unit 10 instructs the frame dropper 14 to drop the video frame in step 480.

Further, if the received video frame is an I-frame, in step 430, the digital broadcasting receiving unit 10 determines whether or not the I-frame is the Nth I-frame.

If it is determined that the I-frame is the Nth I-frame, the digital broadcasting receiving unit 10 proceeds to step 440 and video decodes the I-frame, and then the decoded frame is displayed through the display (not shown) in step 450. And, the digital broadcasting receiving unit 10 sets the numeral of the I-frame as 0 in step 460 and then returns to step 410.

In the meantime, if it is determined that the I-frame is not the Nth I-frame, the digital broadcasting receiving unit 10 increments the I-frame numeral in step 470. Then, the digital broadcasting receiving unit 10 instructs the frame dropper 14 to drop the video frame in step 480.

As such, if all P-frames are dropped and one I-frame for every predetermined Nth frame is decoded, the scene is changed every few minutes. If the broadcasting program is a sports game, and the user is a sports fanatic, the user would prefer watching the sports game even though the scene is changed every few minutes rather than not watching it in real time. In this case, the mobile terminal decodes all audio frames so that the user knows of the progress of the sports game.

The method of decoding all I-frames and selectively dropping P-frames will be described with reference to FIGS. 7 and 8.

Figure 7:
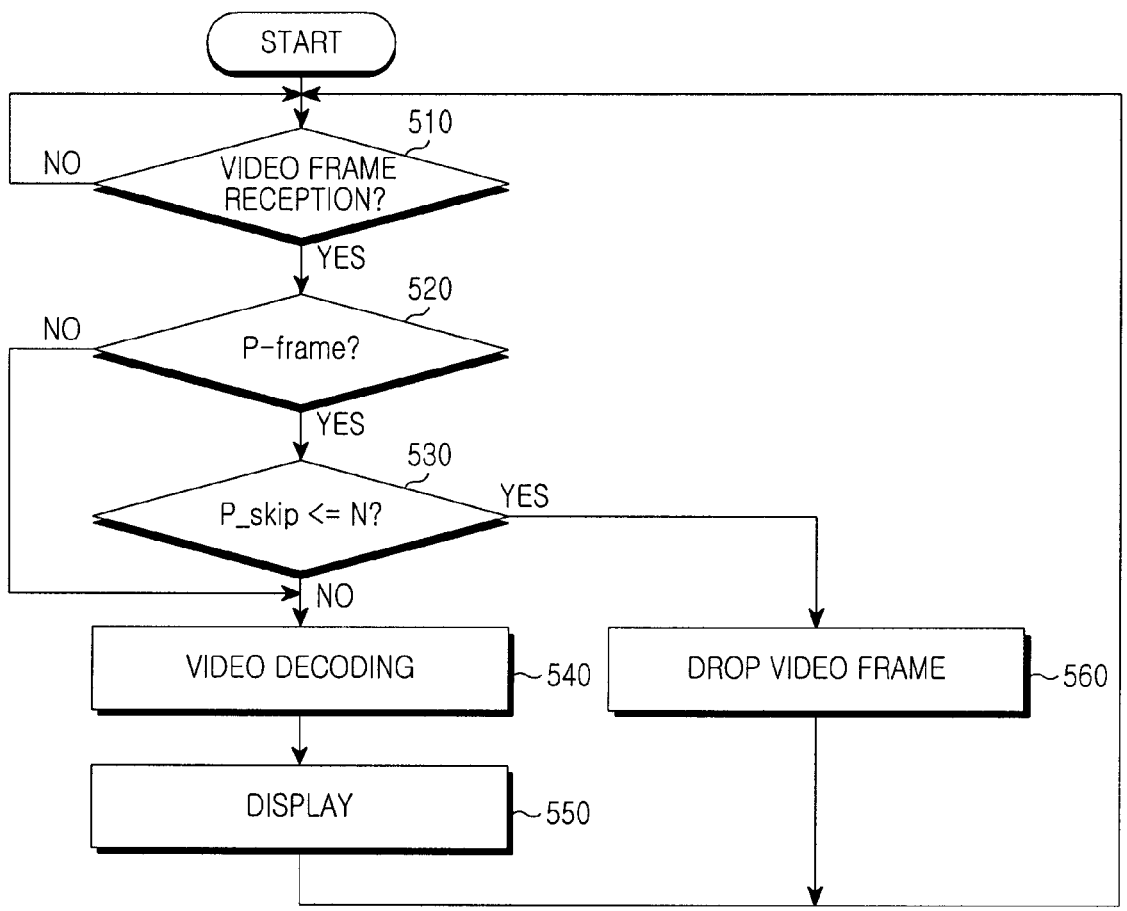
FIG. 7 is a flowchart illustrating a method of decoding all I-frames and dropping a predetermined number of P-frames per second according to an exemplary embodiment of the present invention.
Figure 8:
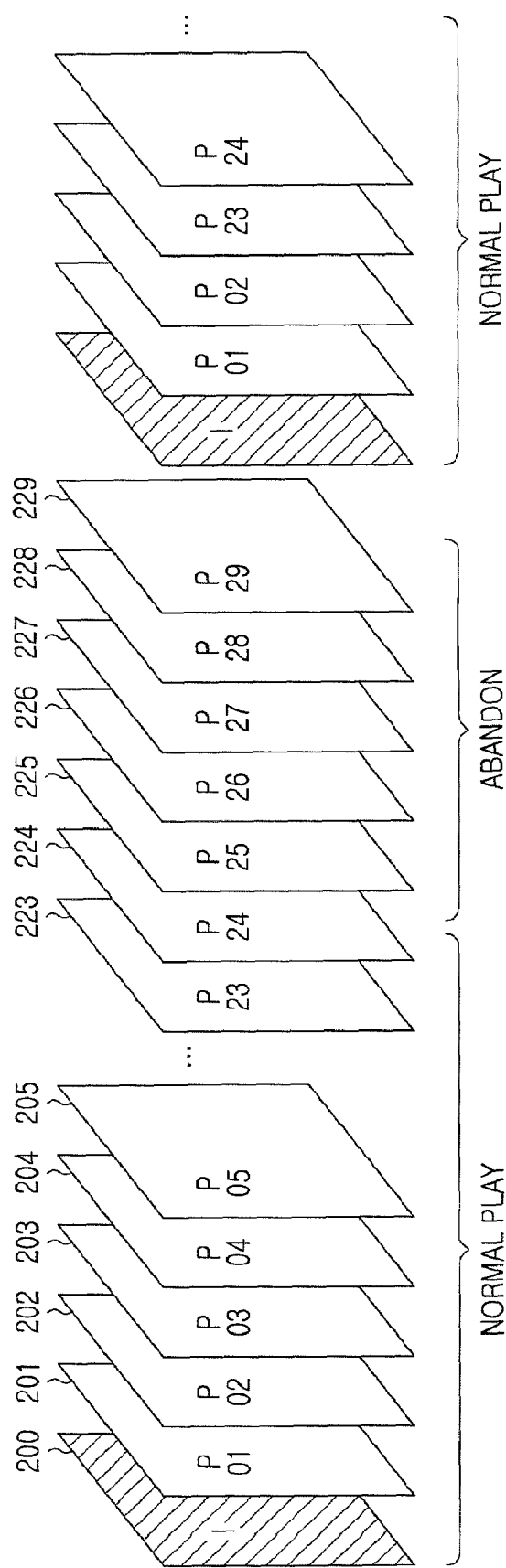
FIG. 8 diagrammatically illustrates a selective drop of video frames according to the method shown in FIG. 7.

FIG. 7 is a flowchart illustrating the method of decoding all I-frames and dropping a predetermined number of P-frames per second according to an exemplary embodiment of the present invention. FIG. 8 diagrammatically illustrates the selective drop of P-frames according to the method shown in FIG. 7.

In the method shown in FIG. 7, P-frames located at a rear part from among the P-frames received per second are dropped. As mentioned previously, a P-frame forms an image of the motion part of the video based on the I-frame and any previous P-frames. Therefore, if a P-frame positioned in the middle of the P-frames is dropped, the subsequent P-frames can not be formed appropriately. If the P-frames just prior to the I-frame which is not influenced from the previous frame is dropped, the other frames are not influenced so it has a minimal influence on playing the video image.

Referring to FIG. 7, the digital broadcasting receiving unit 10 determines whether or not the frame dropper 140 receives the video frame from the TS demultiplexer 12 in step 510. Then, the digital broadcasting receiving unit 10 determines whether or not the received video frame is a P-frame. If the received video frame is an I-frame, the digital broadcasting receiving unit 10 proceeds to step 540 and video decodes the I-frame, and then the decoded I-frame is displayed through the display (not shown) in step 550.

If the received video frame is a P-frame, the digital broadcasting receiving unit 10 proceeds to step 530 to determine whether or not the P-frame is the subsequent frame of the Nth P-frame among the P-frames received per second. For example, referring to FIG. 8, the subsequent P-frames of the 25th P-frame among the P-frames 201 through 229 received per second are dropped. Accordingly, in the example illustrated in FIG. 8, the digital broadcasting receiving unit 10 can determine whether the P-frame is the subsequent frame of the 25th P-frame or not.

If the P-frame is the subsequent frame of the Nth P-frame among the P-frames received per second, the digital broadcasting receiving unit 10 instructs the frame dropper 14 to drop the video frames in step 560.

In this way, if all I-frames are decoded and a predetermined number of the P-frames are dropped, the degradation of the image is nearly imperceptible to the user. Therefore, according to the exemplary embodiments of the present invention, the power consumption can be decreased without influencing the user's viewing of the broadcasting.

When the power consumption is decreased according to the described present invention, the amount of the power saved is exemplified below.

For example, if one I-frame and 29 P-frames are transmitted per second, the brightness level of the backlight of the display and the speaker volume is set to level 1 in the Table 1, and the basic operating current is 150 mA/hour, the current consumption amount per hour in normal playing and decoding one I-frame for every 5 I-frames are calculated below, with reference to Table 1.

Normal Playing (All Frames Decoded)

150 mA/hour+(0.002 mA/frame×1 frame/second+ 0.001 mA/frame×29 frames/second)×3600 sec/ hour+100 mA/hour+70 mA/hour=431.6 mA/hour Decreased Power Consumption Playing (I-Frame Skip (N=5))

150 mA/hour+((0.002 mA/frame×1 frame/second)/ 5)×3600 sec/hour+70 mA/hour+100 mA/hour)= 321.44 mA/hour Accordingly, based on a fully charged 800 mA/hour battery, in normal playing and I-frame skip (N=5), the available playing time is 800/431.6=1.85 hours and 800/321.44=2.49 hours, respectively.

The exemplary embodiments of the present invention control the power consumption by selectively decoding the I-frames and P-frames forming the video stream in the mobile terminal equipped with the function of receiving the digital broadcasting and thus provide a power saving mode which allows the user to watch the desired program until the end with the limited capacity of the battery. Further, the exemplary embodiments of the present invention store the power consumption amount of the components necessary for receiving and outputting the digital broadcasting in a database and inform the user of the expected available playing time based on the present capacity of the battery using the broadcasting information of the receiving program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal for receiving digital broadcasting, the mobile terminal comprising:
   a battery capacity detector to detect a current usable capacity of a battery;
   a digital broadcasting receiving unit to receive digital broadcasting;

a power consumption amount database that stores information regarding power consumption of components for receiving and outputting the digital broadcasting; and a controller to receive the usable capacity of the battery from the battery capacity detector upon receiving the digital broadcasting, calculate the power necessary for receiving and outputting the digital broadcasting with reference to the power consumption amount database, compare the usable capacity of the battery with the necessary power, and control the power applied to the components for receiving and outputting the digital broadcasting according to a plurality of power saving requirements if the usable capacity of the battery is lower than the necessary power, wherein the plurality of the power saving requirements comprises decoding all I-frames of the digital broadcasting and selectively dropping P-frames of the digital broadcasting.

2. The mobile terminal as claimed in claim 1, wherein the controller considers broadcasting duration of the digital broadcasting in calculating the necessary power.

3. The mobile terminal as claimed in claim 1, wherein the plurality of the power saving requirements further comprises at least one of decreasing a brightness level of a backlight of a display and turning down a volume level of an audio apparatus.

4. The mobile terminal as claimed in claim 3, the mobile terminal further comprising:
   a volume controller to control the audio apparatus volume outputted through a speaker; and
   a display driver to control the brightness level of the backlight of the display.

5. The mobile terminal as claimed in claim 1, wherein the digital broadcasting receiving unit comprises:
   a transmission stream (TS) demultiplexer to receive a transmission stream packet to form audio frames and video frames;
   an audio decoder to receive the audio frames from the TS demultiplexer to audio decode and output audio data;
   a video decoder to receive the video frames from the TS demultiplexer to video decode and output video data; and
   a frame dropper to selectively drop the audio frames supplied to the audio decoder and the video frames supplied to the video decoder.

6. A method for receiving digital broadcasting in a mobile terminal, the method comprising the steps of:
   preparing a power consumption amount database that stores information regarding power consumption of components necessary for receiving and outputting digital broadcasting;
   obtaining a usable capacity of a battery of the mobile terminal when receiving the digital broadcasting;
   calculating power necessary for receiving and outputting the digital broadcasting with reference to the power consumption amount database; and
   comparing the usable capacity of the battery with the necessary power and controlling the power applied to the components necessary for receiving and outputting the digital broadcasting according to a plurality of power saving requirements if the usable capacity of the battery is lower than the necessary power, wherein the plurality of the power saving requirements comprises decoding all I-frames of the digital broadcasting and selectively dropping P-frames of the digital broadcasting.

7. The method as claimed in claim 6, wherein the step of calculating the necessary power is performed by considering broadcasting duration of the digital broadcasting.

8. The method as claimed in claim 6, wherein the plurality of the power saving requirements further comprises at least one of decreasing a brightness level of a backlight of a display and turning down a volume level of an audio apparatus.

9. A mobile terminal for receiving digital broadcasting, the mobile terminal comprising:
   means for receiving and outputting digital broadcasting;
   means for storing information regarding power consumption of the means for receiving and outputting digital broadcasting;
   means for obtaining a usable capacity of a battery of the mobile terminal when receiving digital broadcasting;
   means for calculating power necessary for receiving and outputting the digital broadcasting with reference to the stored information regarding power consumption; and
   means for operating the means for receiving and outputting digital broadcasting in a power saving mode if the usable capacity of the battery is lower than the calculated necessary power,
   wherein all I-frames of the digital broadcasting are decoded and P-frames of the digital broadcasting are selectively dropped in the power saving mode.

10. The mobile terminal as claimed in claim 9, wherein the power saving mode further implements at least one of decreasing a brightness level of a display and reducing a volume level of an audio apparatus.

11. The mobile terminal as claimed in claim 9, further comprising means for obtaining a broadcasting duration of the digital broadcasting.

12. The mobile terminal as claimed in claim 11, wherein the means for calculating the necessary power considers the broadcasting duration of the digital broadcasting.

13. The mobile terminal as claimed in claim 11, wherein the broadcasting duration is obtained from the digital broadcasting.

14. The mobile terminal as claimed in claim 11, wherein the broadcasting duration is obtained from user input.

15. The mobile terminal as claimed in claim 11, wherein the means for receiving and outputting digital broadcasting comprises:
   a transmission stream (TS) demultiplexer to receive a transmission stream packet to form audio frames and video frames;
   an audio decoder to decode the audio frames and output audio data;
   a video decoder to decode the video frames and output video data; and
   a frame dropper to selectively drop audio and video frames.

16. The mobile terminal as claimed in claim 1, wherein last two or more P-frames following each I-frame are dropped.

17. The method as claimed in claim 6, wherein last two or more P-frames following each I-frame are dropped.

18. The mobile terminal as claimed in claim 9, wherein last two or more P-frames following each I-frame are dropped.

* * * * *